US006564908B2

(12) United States Patent
Sanchez et al.

(10) Patent No.: US 6,564,908 B2
(45) **Date of Patent: *May 20, 2003**

(54) EMBOSSED PANELS WITH DECORATIVE LAMINATE FOR ELEVATOR CARS

(75) Inventors: Emilio A. Sanchez, Nutley, NJ (US); James H. Chittum, Mechanicsburg, PA (US); William T. Leonard, Gettysburg, PA (US)

(73) Assignee: Inventio AG, Hergiswil (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/576,708

(22) Filed: May 22, 2000

(65) Prior Publication Data

US 2002/0195297 A1 Dec. 26, 2002

(51) Int. Cl.[7] .................................................. B32B 3/28

(52) U.S. Cl. ....................... 187/414; 187/401; 428/551; 52/783.19

(58) Field of Search ................................ 187/401, 414; 428/551; 52/783.19

(56) References Cited

U.S. PATENT DOCUMENTS

| | | | | |
|---|---|---|---|---|
| 3,103,708 A | | 9/1963 | Pomeroy et al. | |
| 3,383,820 A | | 5/1968 | Kates | |
| 3,574,108 A | * | 4/1971 | Lewis | 161/113 |
| 4,394,809 A | * | 7/1983 | Sherwood et al. | 52/512 |
| 4,414,257 A | * | 11/1983 | Haraga et al. | 428/182 |
| 4,433,023 A | * | 2/1984 | Ohta et al. | 428/182 |
| 4,594,281 A | * | 6/1986 | Haraga et al. | 428/172 |
| 4,635,756 A | | 1/1987 | Sherwood et al. | |
| 5,132,164 A | * | 7/1992 | Moriya et al. | 428/199 |
| 5,134,037 A | * | 7/1992 | Makino | 428/551 |
| 5,454,449 A | * | 10/1995 | Makimattila et al. | 187/401 |
| 5,462,786 A | * | 10/1995 | Van Ert | 428/171 |
| 5,483,905 A | * | 1/1996 | Johansson | 52/780 |
| 5,893,245 A | * | 4/1999 | Sekiguchi et al. | 52/78 |
| 6,387,468 B1 | * | 5/2002 | Kim et al. | 428/67 |

FOREIGN PATENT DOCUMENTS

| | | | |
|---|---|---|---|
| JP | 11-245181 | * | 9/1998 |
| WO | WO 97/09265 | | 1/1997 |

* cited by examiner

*Primary Examiner*—Thomas J. Brahan
(74) *Attorney, Agent, or Firm*—MacMillan, Sobanski & Todd, LLC

(57) ABSTRACT

A wall panel assembly for use as an interior wall of an elevator car includes a wall panel embossed to form a central portion, a decorative panel having an ornamental front surface, and an adhesive material adhering the decorative panel to the wall panel. When the wall panel is installed in an elevator car, the decorative panel ornamental front surface is visible to passengers. The decorative panel can be formed of a flexible laminate material to follow the contour of the central portion. The central portion is surrounded by a rib or curved portion to hide an edge of the decorative panel.

15 Claims, 3 Drawing Sheets

EMBOSSED PANELS WITH DECORATIVE LAMINATE FOR ELEVATOR CARS

BACKGROUND OF THE INVENTION

The present invention relates generally to a wall panel for an elevator car having a decorative surface visible to passengers.

In office buildings, it is important to keep the appearance of the interior of an elevator car in good condition and, as well, to have the elevators in operation at all times. Elevators represent a large portion of the cost of modem buildings, and their usage particularly in automatic elevator operation is substantially continuous. Damage may occur to the wall panels and on occasion they must be repaired. To take an elevator out of use for a period of time while the panels are being removed laboriously and taken to a factory or a repair establishment and refinished is expensive, but primarily it interferes with operation of the business being conducted.

Current elevator systems use hung panels as a means to enhance the architectural look of the interior of the elevator car and make replacement easier. Hung panels are attached to the fixed car walls using "buttons" that fit into keyhole shaped slots cut out of the walls. This method of fastening is not visible to the public and allows a maintenance worker to remove an existing panel and replace it with a new panel is a relatively short time.

SUMMARY OF THE INVENTION

The present invention concerns replaceable panels for elevator cars, which panels may be taken out as desired to replace or repair. Such replacement or repair does not require the elevator car to be inoperative for long periods of time.

This invention relates to an elevator car having replaceable panels that can be modernized on occasion and are a fully serviceable unit within the elevator car.

A wall panel assembly for use as an interior wall of an elevator car includes: a wall panel having a front surface and being embossed to form a central portion; a decorative panel having an ornamental front surface and an opposed rear surface; and an adhesive material applied between the wall panel front surface and the decorative panel rear surface to adhere the decorative panel to the wall panel. When the wall panel is installed in an elevator car, the decorative panel ornamental front surface is visible to passengers. The decorative panel can be formed of a flexible laminate material.

An embossed pattern can be generated on the wall panel and a laminated decorative panel applied directly to the wall panel. This new wall panel assembly can be used in lieu of the traditional hung panel arrangement providing a particular architectural look with new manufacturing equipment and technology.

The embossing of the walls is achieved through an automated forming procedure when the car walls are processed. The laminate is attached to the wall panel using a permanent adhesive with the outer edges of the laminate bounded by the embossed surface. The shape and size of the embossed portion and laminate can be expanded beyond the typical rectangular shapes of hung panels to other geometric shapes including logos.

The embossing adds to the structural rigidity of the wall panels, adding overall stiffness to the elevator car structure. It is an object of the present invention to apply a decorative panel directly to the elevator car wall panel without the use of hardware.

It is another object of the present invention to hide the edges of a decorative panel applied to an elevator car wall panel.

It is further object of the present invention to stiffen elevator car walls.

It also is an object of the present invention to provide decorative shapes and curved surfaces on elevator car walls.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
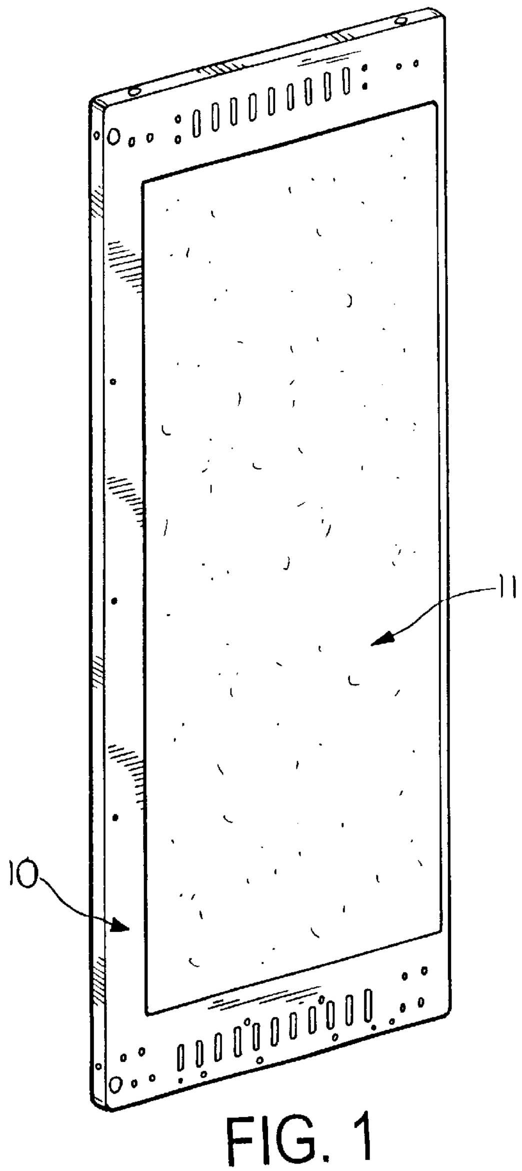
FIG. 1 (PRIOR ART)
FIG. 1 is a perspective view of a prior art elevator car wall panel having a hung decorative panel.
Figure 2:
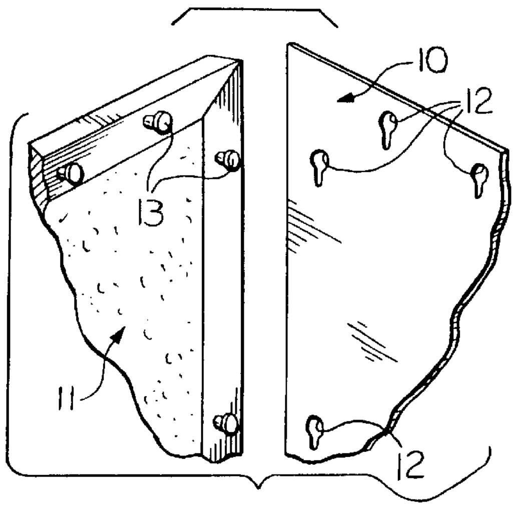
FIG. 2 (PRIOR ART)
FIG. 2 is an enlarged, exploded fragmentary view of the elevator car wall panel shown in the FIG. 1.

There is shown in the FIGS. 1 and 2 a prior art wall panel 10 for an elevator car. The wall panel 10 is planar and is utilized to form each of the interior walls of an elevator car. In some cases, depending upon the size of the car and the ornamental design desired, two or more wall panels are used for each car wall. A planar decorative panel 11 is attached to and covers a portion of a front surface of the wall panel 11 that faces an interior of an elevator car (not shown). The wall panel 10 has a plurality of keyhole shaped slots 12 formed therein positioned just inside a periphery of the decorative panel 11. A plurality of fasteners 13 is used to mount the decorative panel. Each of the fasteners 13 extends from a rear surface of the decorative panel 11 and is positioned to cooperate with an associated one of the slots 12. Each of the fasteners 13 has an enlarged head that passes through an larger upper portion of the associated slot 12 and a smaller diameter body that is received in a smaller lower portion of the slot. Thus, the decorative panel 11 is installed by moving its rear surface toward the front surface of the wall panel 10, inserting the fasteners 13 into the upper portions of the slots 12 and lowering the decorative panel to releasably engage the fasteners with the lower portions of the slots. This process is reversed to remove the decorative panel 11 from the elevator car wall panel 10.

Figure 3:
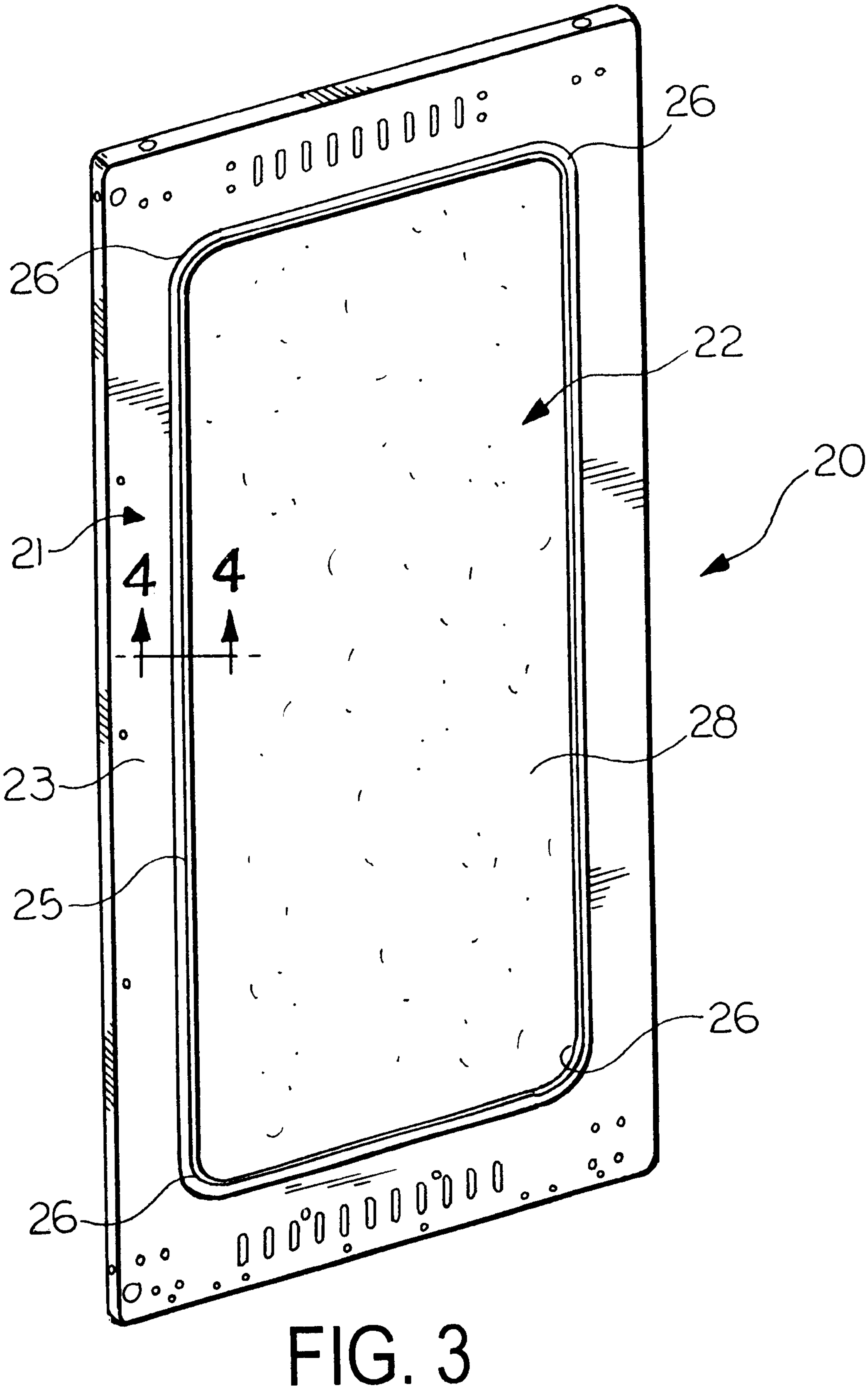
FIG. 3 is a perspective view of a wall panel assembly for an elevator car in accordance with the present invention.
Figure 4:
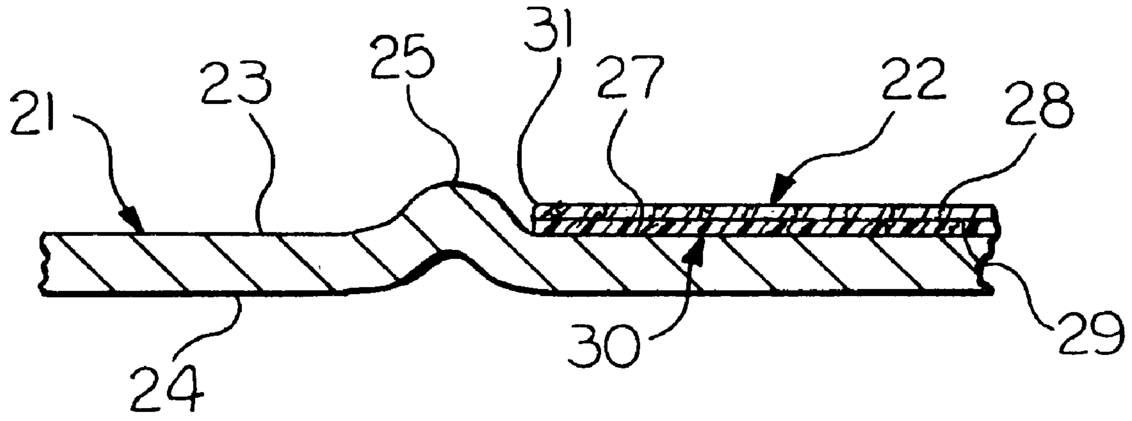
FIG. 4 is an enlarged cross-sectional view as if taken along the line 4—4 in the FIG. 3.

There is shown in the FIGS. 3 and 4 a wall panel assembly 20 for an elevator car including a wall panel 21 having a decorative panel 22 attached thereto. The wall panel 21 is similar in construction to the prior art wall panel 10 shown in FIG. 1, but has been modified in accordance with the present invention. The wall panel 21 is typically formed of metal with a planar front surface 23 for facing the interior of the elevator car and an opposed planar rear surface 24. A rib 25 is formed in the wall panel 21 by any suitable process such as embossing to extend or protrude from a plane of the front surface 23 and form a depression in a plane of the rear surface 24. The rib 25 can be formed in any desirable pattern such as the rectangle with rounded corners 26 shown in the FIG. 3.

The rib 25 functions to strengthen and make more rigid the wall panel 21 thereby permits construction from thinner gage material than otherwise practical for use in an elevator car. The rib 25 also functions as an ornamental design element and a border separating a central portion 27 from the remainder of the front surface 23. The central portion 27 provides a mounting surface for the decorative panel 22. The decorative panel 22 can cover the entire central portion area, as shown, or any portion thereof.

The decorative panel 22 can be formed of a laminate material having a front surface 28 with a suitable ornamental design. Typical designs are simulated wood or metal, murals, corporate logos, etc. The laminate material can be, for example, vinyl or other known covering material that is durable and easy to clean. The decorative panel 22 has a rear surface 29 facing the front surface 23 of the wall panel 21 and is adhered thereto by an adhesive material 30. The adhesive 30 can be a permanent adhesive to prevent removal of the decorative panel 22 from the wall panel 21. The adhesive 30 can be applied to either of the facing surfaces 23 and 29 before assembly.

Figure 5:
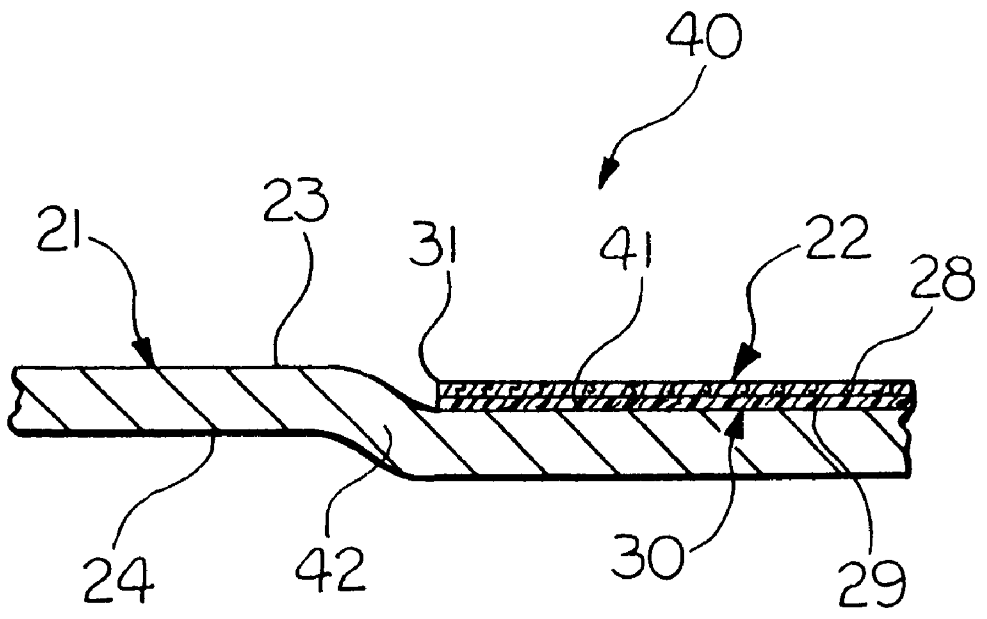
FIG. 5 is an enlarged cross-sectional view similar to the FIG. 4 showing an alternate embodiment of the present invention.

There is shown in the FIG. 5 a wall panel assembly 40 for an elevator car including the wall panel 21 having the decorative panel 22 attached thereto with the adhesive 30. However, instead of the continuous embossed rib 25, an entire central portion 41 of the wall panel 21 is embossed providing an area recessed from the front surface 23 into which the decorative panel 22 is inserted. The embossing process creates a curved transition portion 42 surrounding the central portion 41 in a manner similar to the rib 25 surrounding the central portion 27 as shown in the FIG. 3. The curved transition portion 42 connects the central portion 41 to the remainder of the wall panel 21 surrounding the central portion. In the assemblies 20 and 40, an edge 31 of the decorative panel 22 is hidden by the rib 25 and the transition portion 42, respectively.

As stated above, shapes and designs other than the rectangular shape shown in the drawings can be embossed in the wall panel 21. Furthermore, the central portions 27 and 41 can deviate from the planar shape shown to present curved surfaces to the interior of the elevator car. A relatively thin, flexible laminate can be used for the decorative panel 22 to follow such curved surfaces. Also, the central portion can be embossed to extend outwardly from the wall panel front surface; the reverse of the configuration shown in the FIG. 5. Thus, the present invention contemplates embossing various combinations of ribs and surface shapes, each of which can protrude or be recessed or be in the same plane as the remainder of the wall panel front surface.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator car interior wall panel assembly comprising:

an interior wall panel formed from a single sheet of metal material having a thickness suitable for embossing and a front surface extending generally parallel to a rear surface, said wall panel having a generally planar peripheral portion adjacent a central portion, said peripheral portion and said central portion being joined by an embossed intermediate portion displaced from a plane of said peripheral portion, said intermediate portion increasing a structural rigidity of said wall panel;

a decorative panel having an ornamental front surface and an opposed rear surface facing said wall panel front surface, said decorative panel front and rear surfaces being joined by an edge; and an adhesive material applied to at least one of said wall panel front surface central portion and said decorative panel rear surface and permanently adhering said decorative panel to said wall panel front surface central portion with said decorative panel edge being adjacent said wall panel intermediate portion whereby when said wall panel is installed in an elevator car, said decorative panel ornamental front surface faces an interior of the elevator car and said decorative panel edge is bidden from view by said wall panel intermediate portion.

2. The wall panel assembly according to claim 1 wherein said intermediate portion is a rib protruding from said plane of said peripheral portion.

3. The wall panel assembly according to claim 1 wherein said central portion is recessed from said plane of said peripheral portion.

4. The wall panel assembly according to claim 3 wherein said intermediate portion is curved.

5. The wall panel assembly according to claim 1 wherein said peripheral portion surrounds said central portion.

6. The wall panel assembly according to claim 1 wherein said decorative panel is formed of a laminate material.

7. The wall panel assembly according to claim 6 wherein said laminate material is a vinyl material.

8. An elevator car interior wall panel assembly comprising:

an interior wall panel having a thickness suitable for embossing and a front surface with a peripheral portion connected to a central portion by an embossed intermediate portion, said intermediate portion being displaced from a plane of said peripheral portion to increase a structural rigidity of said wall panel, said wall panel being formed from a single sheet of material of generally uniform thickness;

a decorative panel having an ornamental front surface joined to an opposed rear surface by an edge; and an adhesive material applied between said wall panel front surface central portion and said decorative panel rear surface and adhering said decorative panel to said wall panel with said decorative panel edge adjacent said intermediate portion whereby when said wall panel is installed in an elevator car, all of said decorative panel ornamental front surface faces an interior of the elevator car and said decorative panel edge is hidden from view by said intermediate portion.

9. The wall panel assembly according to claim 8 wherein said decorative panel is formed of a flexible laminate material.

10. The wall panel assembly according to claim 9 wherein said central portion extends in a plane parallel to and spaced from said plane of said wall panel front surface peripheral portion.

11. The wall panel assembly according to claim 8 wherein said wall panel is embossed to form said intermediate portion as at least one rib adjacent said central portion.

12. The wall panel assembly according to claim 8 wherein said peripheral portion surrounds said central portion.

13. An elevator car interior wall panel assembly comprising:

an interior wall panel having a thickness suitable for embossing and a front surface with a peripheral portion surrounding and being connected to a central portion by an embossed intermediate portion, said intermediate portion being displaced from a plane of said peripheral portion, said wall panel being formed from a single sheet of material;

a decorative panel having an ornamental front surface connected to an opposed rear surface by an edge; and an adhesive material applied between said wall panel front surface and said decorative panel rear surface and adhering said decorative panel to said wall panel central portion whereby when said wall panel is installed in an elevator car, said decorative panel ornamental front surface faces an interior of the elevator car and said edge is hidden from view by said intermediate portion.

14. The wall panel assembly according to claim 13 wherein said intermediate portion includes a rib protruding beyond said plane of said wall panel front surface peripheral portion.

15. The wall panel assembly according to claim 13 wherein said central portion is recessed from said plane of said wall panel front surface peripheral portion and said intermediate portion is a curved portion connecting said central to said peripheral portion.

* * * * *